United States Patent [19]

Lundquist

[11] Patent Number: 5,232,607

[45] Date of Patent: Aug. 3, 1993

[54] METHOD FOR MOBILE PLASTIC AND OIL SEPARATION

[76] Inventor: Lynn C. Lundquist, 10833 NE. Russell, Portland, Oreg. 97220

[21] Appl. No.: 904,140

[22] Filed: Jun. 25, 1992

Related U.S. Application Data

[63] Continuation-in-part of Ser. No. 896,626, Jun. 6, 1992, which is a continuation-in-part of Ser. No. 677,307, Mar. 29, 1991, Pat. No. 5,149,424.

[51] Int. Cl.⁵ .......................... B01D 21/26; B04B 1/00
[52] U.S. Cl. .................................... 210/787; 210/781; 210/800; 210/241; 210/380.1; 209/3; 209/12; 241/24; 264/37
[58] Field of Search .............. 210/295, 806, 85, 173, 210/304, 305, 360.2, 365, 374, 377, 379, 382, 241, 781; 209/3, 12; 241/24; 264/37

[56] References Cited

U.S. PATENT DOCUMENTS

| | | | |
|---|---|---|---|
| 2,878,943 | 3/1959 | Ziherl | 210/379 |
| 3,311,240 | 3/1967 | Hirsch | 210/212 |
| 3,366,318 | 1/1968 | Steimel | 233/5 |
| 3,954,611 | 5/1976 | Reedy | 210/241 |
| 4,122,014 | 10/1978 | Weininger et al. | 210/377 |
| 4,137,176 | 1/1979 | Dudley et al. | 210/375 |
| 4,186,096 | 1/1980 | Areaux et al. | 210/377 |
| 4,253,960 | 3/1981 | Dudley et al. | 210/373 |
| 4,356,908 | 11/1982 | Embro, Jr. | 198/461 |
| 4,772,380 | 9/1988 | Cramer et al. | 210/534 |

*Primary Examiner*—Robert A. Dawson
*Assistant Examiner*—David Reifsnyder
*Attorney, Agent, or Firm*—Lynn Lundquist

[57] ABSTRACT

The present invention is a process for separating granulated plastic oil containers from the oil residue remaining within the containers after use. In this process, the plastic oil container is granulated prior to the separation of the oil from the plastic; the subsequent separation is done mechanically without washing or solvent deployment. The system comprises a conveying system, a size reduction means operating in conjunction with a centrifugal separation apparatus, and a means of segregating and storing the separated oil and the plastic granulate. In a first embodiment, the process is employed as a truck mounted unit for mobile processing of oil containers at the location of utilization. In a second embodiment, the process is employed as stationary processing facility.

8 Claims, 2 Drawing Sheets

METHOD FOR MOBILE PLASTIC AND OIL SEPARATION

DIVISION OF APPLICATION

This is a continuation-in-part of application Ser. No. 07/677,307 filed Mar. 29, 1991, entitled CENTRIFUGE APPARATUS FOR RESIDUAL LIQUID WASTE REMOVAL FROM RECYCLABLE CONTAINER MATERIAL (now U.S. Pat. No. 5,149,424 with reference to an application entitled RING CENTRIFUGE APPARATUS FOR RESIDUAL LIQUID WASTE REMOVAL FROM RECYCLABLE CONTAINER MATERIAL Ser. No. 07/896,626 still pending which is a continuation-in-part of the above application and was filed on Jun. 6, 1992.

BACKGROUND—FIELD OF THE INVENTION

This invention incorporates the centrifugal separation apparatus as claimed in two prior patent applications into a compact processing system designed to separate oil from the granulated plastic by-product of plastic oil containers. The end products of this separation process are a high purity, homogeneous motor oil and clean, granulated plastic. This processing system may be used as a stationary plant installation, or, as a mobile recovery unit servicing automotive service stations and the like.

Within this process, plastic motor oil containers with residual waste oil are placed in the feed hopper of the apparatus. From the hopper, they are conveyed to a chipper which granulates the entire container and its contents. Subsequently the granulated container is discharged into a centrifuge separating device.

The centrifuge separates the oil, passing it through a filter system and into an oil holding tank. The granulated plastic is fed into a plastic holding bin for eventual reprocessing at a central plant location.

With an understanding of the present need to protect both our natural environment and to optimize the use of natural resources, the importance of this process should be readily apparent. In a first case, a mechanical separation of the residual waste liquid (most notably, motor oil) from its granulated container assures less pollutants introduced into the waste stream from cleaning operations in the form of an emulsion of water, detergents, and the specific material in the container. In a second case, a mechanical separation assures a greater return of product into its highest value usage with the least energy expanded; that is, motor oil may be recovered in the form of pure motor oil rather than as an emulsion or solvent dilution which requires expensive reprocessing for commercial reuse. Further, this process allows a compact and economical process for reducing the plastic and residual oil waste into reusable components. A further intent of this invention is the provision of a system which is truck mounted and can periodically dispose of used one-quart oil containers at the site of their use such as service stations, automotive garages, and retail automotive oil markets which recycle the used containers.

BACKGROUND—DESCRIPTION OF THE PRIOR ART

The technology of centrifugally separating residual liquid which was packaged within a container from the material proper of said container subsequent to granulating or comminution of the container has not heretofore been addressed in any patent other than those developed by this inventor, (That is to say, CENTRIFUGE APPARATUS FOR RESIDUAL LIQUID WASTE REMOVAL FROM RECYCLE CONTAINER MATERIAL (Ser. No. 07/677,307) now U.S. Pat. No. 5,149,424, CONTINUOUS CENTRIFUGE APPARATUS FOR RESIDUAL LIQUID WASTE REMOVAL FROM RECYCLABLE CONTAINER MATERIAL (Ser. No. 07/696,765) now abandoned, METHOD OF CONTINUOUS CENTRIFUGAL REMOVAL OF RESIDUAL LIQUID WASTE FROM RECYCLABLE CONTAINER MATERIAL (Ser. No. 07/701,778) now U.S. Pat. No. 5,160,441 METHOD OF BATCH CENTRIFUGAL REMOVAL OF RESIDUAL LIQUID WASTE FROM RECYCLABLE CONTAINER MATERIAL (Ser. No. 07/703,007), still pend. CONTINUOUS PROCESS FOR RECLAIMING PLASTIC SCRAP (Ser. No. 07/781,085), still pending and RING CENTRIFUGE APPARATUS FOR RESIDUAL LIQUID WASTE REMOVAL FROM RECYCLABLE CONTAINER MATERIAL filed on Jun. 6, 1992.) Ser. No. 596,625 still pending. This is particularly true for plastic containers in the form of blow molded bottles which have contained motor oils or similar non-water soluble liquids.

A new body of technology is growing for the purpose of reclaiming such plastic and other container materials. In most cases, however, the technology has used mechanical agitation in conjunction with washing and soaking baths to remove the contaminant from the granulated container.

Centrifugal separation of a residual liquid contaminant of a container, and the granulated material proper from the container, is a novel innovation as suggested in this series of inventions.

Numerous mechanical separation devices have been devised which use centrifugal action. Among them, are those which centrifugally separate cutting fluids and oils from metal chips, borings, and the like as encountered in machine shop operations. In this regard, the patents of Dudley et al (U.S. Pat. Nos. 4,137,176 and 4,253,960), Areaux et al. (U.S. Pat. No. 4,186,096), Weininger et al. (U.S. Pat. No. 4,122,014), Rousselet (U.S. Pat. No. 3,570,135), Steimel (U.S. Pat. No. 3,366,318), and Ziherl (U.S. Pat. No. 2,878,943) deserve attention. (Note that the two patents of Dudley and the patent of Areaux are refinements of the same practice.) Prior art by Welch (U.S. Pat. No. 636,016) for the removal of liquid from garbage also merits attention. It can be shown, however, that each of these representations of the prior art are substantially different from both the function and the intended use of the present invention.

Thus, the process of incorporating such a centrifugal separation unit into a compact system applicable to both stationary and mobile use is novel.

OBJECTIVES OF THE INVENTION

This process was developed with an understanding of the limitations of the present methodology used to reclaim containers with residual liquid waste(most notably plastic oil filled containers). Furthermore, it was designed with a number of other objectives considering its potential application.

1. It is the general objective of this invention to provide a process of mechanically separating residual liquid waste (motor oil) contamination from a granulated plastic container.

2. Another objective of this invention is to remove this residual liquid waste (motor oil) without creating an emulsion by the addition of water or other chemicals.

3. Another objective of this invention is to salvage this residual liquid waste (motor oil) in a usable form for further use without significant product down-grading.

4. Another objective of this invention is to separate the residual liquid waste (motor oil) or other contaminant from the plastic product without introducing that contaminant into the waste water stream.

5. Another objective of this invention is to provide a compact and economical unit which could be used in either a central processing facility or as a truck or trailer mounted unit.

7. A final objective of this invention is to utilize the technology of four previous patent applications to this oil separation methodology. That is, U.S. Pat. No. 5,110,060 entitled CUTTER ENHANCEMENT FOR PLASTIC SIZE REDUCTION EQUIPMENT, the application entitled CENTRIFUGE APPARATUS FOR RESIDUAL LIQUID WASTE REMOVAL FROM RECYCLABLE CONTAINER MATERIAL, Ser. No. 07/677,307 now U.S. Pat. No. 5,140,424, the application entitled RING CENTRIFUGE APPARATUS FOR RESIDUAL LIQUID WASTE REMOVAL FROM RECYCLABLE CONTAINER MATERIAL filed on Jun. 6, 1992, Ser. No. 07/896,626 still pending and, the application entitled METHOD OF BATCH CENTRIFUGAL REMOVAL OF RESIDUAL LIQUID WASTE FROM RECYCLABLE CONTAINER MATERIAL, Ser. No. 07/703,007 still pending.

These and other objectives and advantages of the present invention, and the manner in which they are achieved, will become apparent in the following specifications and claims.

SUMMARY OF THE INVENTION

In its preferred embodiment, the present invention is a process employing a centrifuge device for separating chips or shreds of containers from whatever liquid residue remains within these containers. (henceforth, the plastic chips or shreds resulting from size reduction of the container material will be referred to as granulate. The process of plastic size reduction will be referred to as granulation. In this process, the apparatus which produces the granulate will be referred to as a chipper rather than the more common term granulator inasmuch as the end product is a dimensionally controlled chip rather than a random segment.)

In brief, the process includes a feed section consisting of a feed hopper where the oil contaminated containers are initially loaded into the system. Subsequently, a conveyor is used to transport the containers to a chipper. During transport, the conveyor uses proximity or optical sensors to count the containers and regulate the system through-put. From the chipper, the granulated material is fed to the central centrifuge.

The centrifuge separates the granulated plastic from the oil contaminant; the oil is filtered and pumped to an oil holding tank and the granulated plastic is conveyed to a plastic holding bin.

Provision is further made for containment and salvage of any oil spilled during processing. A containment pan (most notably, a liquid-tight liner used on a truck bed) is provided which allows spills to be returned to the oil recovery cycle.

The process finally includes a means of emptying the oil and plastic for further processing. In the case of the plastic holding bin within a truck mounted unit, a bin unloading conveyor is used to discharge the bin contents into suitable containers or other means of handling for reprocessing into recycled plastic.

DESCRIPTION OF THE PREFERRED EMBODIMENTS

Figure 1:
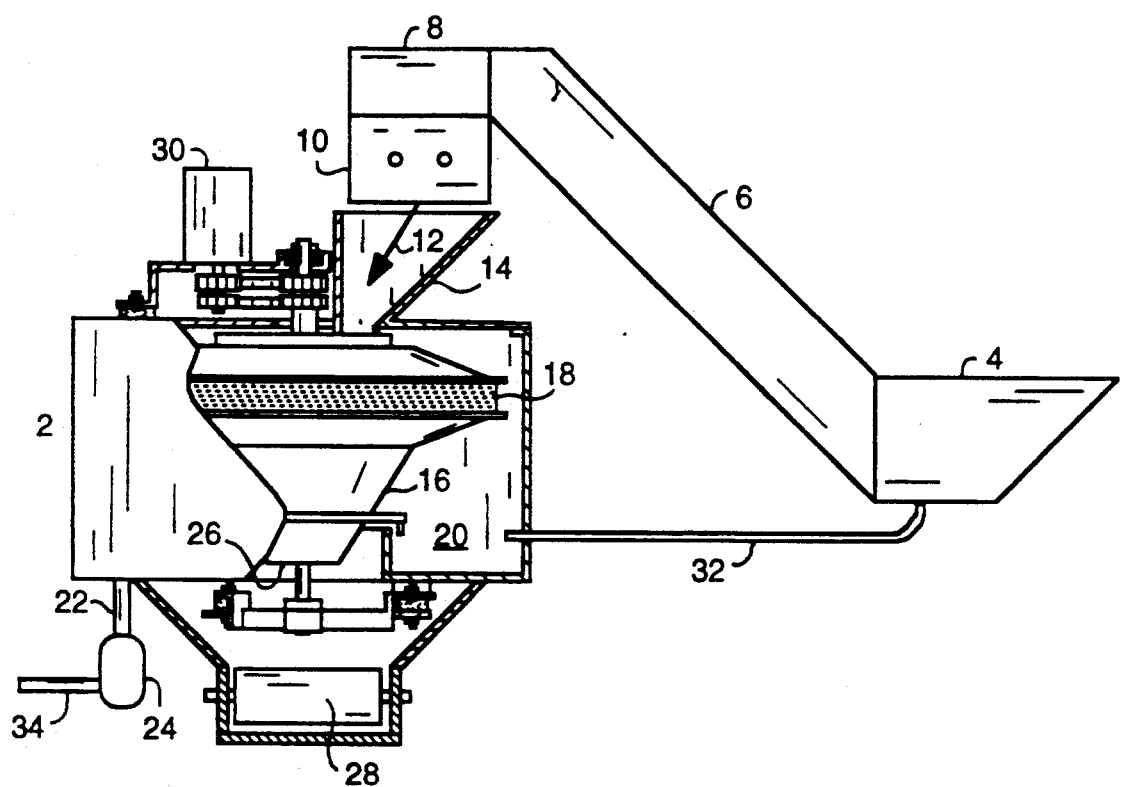
FIG. 1 is a partial sectional view of the centrifuge and chipper conveyor unit.

Referring now to FIG. 1, a centrifugal separator 2 is shown with its related apparatus consisting of a feed hopper 4, chipper conveyor 6, crammer 8, and chipper 10.

Material to be processed—most notably one-quart oil containers with residual liquid waste within—are randomly thrown into the feed hopper 4. In the preferred embodiment, the chipper conveyor 6 performs three important functions in addition to conveying the containers to the crammer 8. A first function of the chipper conveyor 6 is to orient the containers so that they pass through it in single file. This is achieved by restricting the interior dimensions of the chipper conveyor 6 unit to the nominal dimensions of the containers and in providing rotating or stationary deflection means which will orient the containers during their assent. Proper orientation of the containers is necessary for the chipper conveyor 6 to achieve its second function; with optical or proximity sensors mounted within the chipper conveyor 6 unit at the scanning station 7, the containers are counted. Counting containers allows a prospective customer to be charged for the service rendered. However, counting containers also allows the entire unit to be automatically controlled, as will be described latter. This counting function, therefore, allows the chipper conveyor 6 to be intermittently started and stopped to control the rate of movement of containers through the system When the chipper conveyor 6 is operating with containers on its belt, a continuous container supply is fed to the crammer 8 which crushes and forces containers into the granulator 10 at a predetermined rate. Subsequent to being granulated, the oil-contaminated plastic containers exit the granulator 10 at 12 into the centrifuge hopper 14 where they pass directly into the rotating centrifugal separation vessel 16.

Several configurations may be used for the centrifugal separator 2. Irrespective of the particular apparatus used, however, the oil will be flung through a sieve screen 18. The oil is collected in a centrifuge containment housing 20, where it drains through a centrifuge oil drain pipe 22 to an oil pump and filtration unit 24.

At the completion of the spinning cycle, the remaining plastic granulate will be discharged from the discharge opening 26 of the centrifugal separation vessel 16. The granulated material will then be transported by means of a process conveyor 28 to a holding area (which will be shown in FIG. 2).

The centrifugal separator 2 is driven by a motor 30. Depending on its application, this motor will be either a hydraulic motor (in the case of a truck mounted unit) or an electric motor (in the case of a stationary installation or, if required, on a trailer unit).

Inasmuch as some oil will be lost from the contaminated containers before they reach the centrifugal separator 2, requisite drain systems are included to catch all spilled oil. A feed hopper drain 32 (which includes drainage from the entire chipper conveyor 6 system) carries spilled oil directly into the centrifuge containment housing 20.

Figure 2:
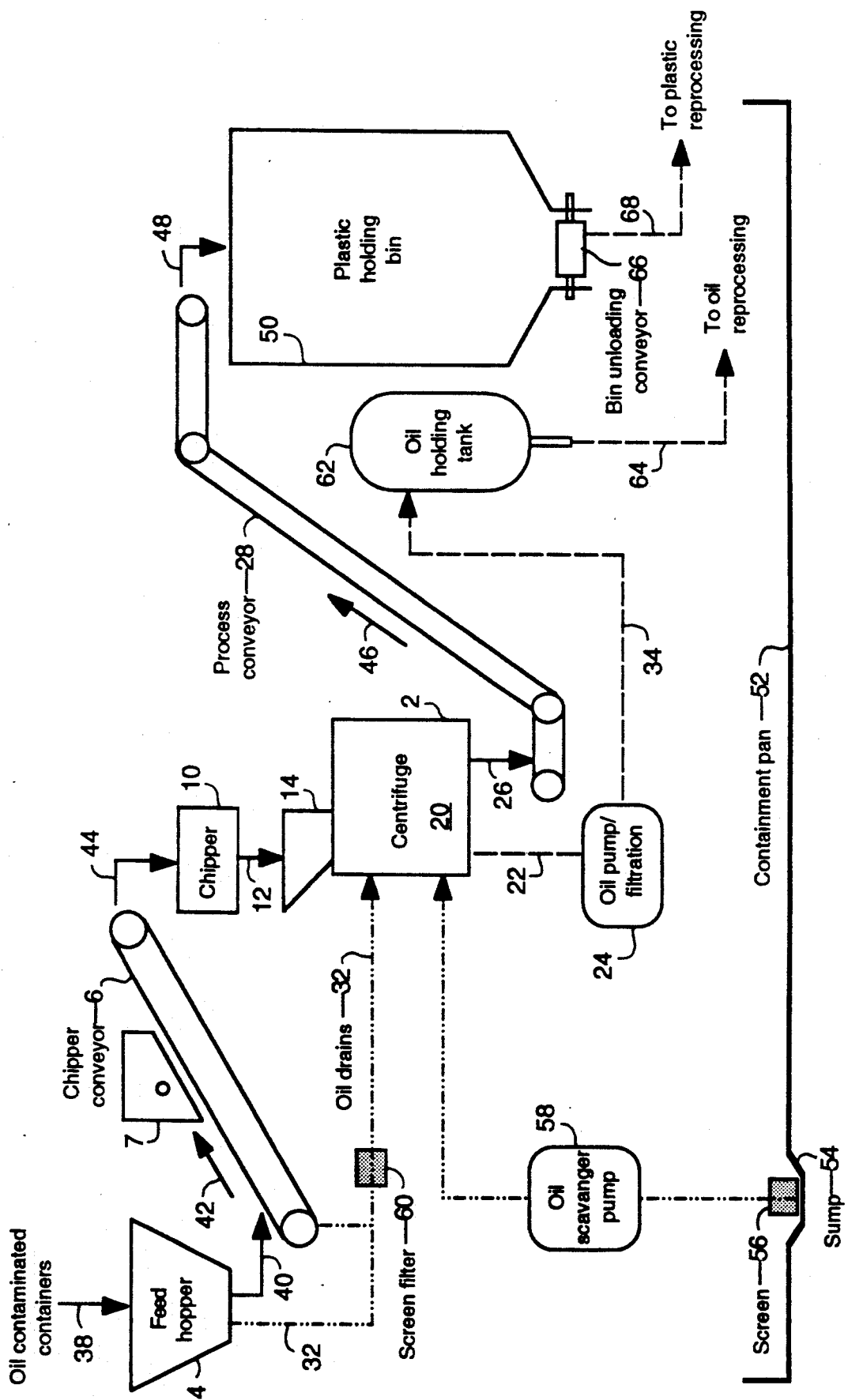
FIG. 2 is a diagrammatic representation of the complete system.

As will be identified further in FIG. 2, an oil pipe 34 system is provided between the oil pump and filtration unit 24 and the oil holding tank.

Referring now to FIG. 2, a complete diagrammatic representation of the process is shown. Oil contaminated plastic containers are fed into the feed hopper 4 at 38. (The primary material route is designated with solid lines. Processed oil salvage routes are indicated with a broken line. Oil scavengering or spill routes are designated with a dot-and-dash line.) In a transition between the feed hopper 4 and the chipper conveyor 6 shown at 40, the containers are oriented with rotating and stationary deflectors. Upon entering the conveying system, they are transported on the chipper conveyor 6 at 42 where they are scanned with proximity or optical sensors in the scanning station 7.

As the containers pass from the chipper conveyor 6 at 44, they pass into the chipper 10. (The chipper 10 consists of the chipper proper and the feed section which is referred to as the crammer 8 in FIG. 1) The granulated material exists the chipper 10 at 12 and fails directly into the immediately adjacent centrifuge hopper 14. (In the preferred embodiment, the chipper 10 and the centrifugal separator 2 are an integral unit.)

Within the centrifuge, the contaminated granulate is subjected to sufficient gravitational force that the liquid waste oil contaminant is stripped from the granulate. Thus, the centrifugal process leaves a contaminant-free plastic which is discharged at 26 and carried by the process conveyor 28 at 46. At 48 the material is off-loaded from the process conveyor 28 into a plastic holding bin 50.

The oil separated from the granulated plastic is flung into the centrifuge containment housing 20 (as described in FIG. 1) where it is consolidated. Prior to discharge of the oil, however, provision must be made for extraneous oil collection. Some oil will escape the containers in the conveying system. Thus, a feed hopper drain 32 (which encompasses the chipper conveyor 6) carries spilled oil from the conveying apparatus to the centrifuge containment housing 20. Further, a containment pan 52 maybe used underneath the entire apparatus. (This would be the case in a truck mounted unit where the entire truck bed is equipped with a containment pan 52.) When this is the case, a sump 54 area is provided into which spilled oil can be squeegeed. Within the sump 54 area, a sump screen 56 pickup for an oil scavenger pump 58 is provided. Spilled oil can then be pumped from the containment pan 52 to the centrifuge containment housing 20.

In order to keep heavy contaminants from the feed hopper drain 32 and the containment pan 52 from entering the cleaner centrifuged oil waste, screen filters are provided in these two systems. Thus, a screen filter is located in the hopper drain line 32 at 60 in addition to the sump screen 56 previously identified.

All sources of oil are thus collected in the centrifuge containment housing 20. From this single location, the oil is drained from the centrifuge oil drain pipe 22 by means of an oil pump and filtration 24 apparatus wherein the oil is more finely filtered. The processed oil is then moved through line 34 to the oil holding tank 62.

Oil is removed from the oil holding tank 62 at 64; recyclable plastic is emptied from the plastic holding bin 50 by means of a bin unloading conveyor 66 at 68.

OPERATION

The operation of the centrifuge and related apparatus is similar whether it is configured for stationary or mobile use; the primary differences being merely in physical lay-out and in the selection of motors. (A stationary unit would use electric motors whereas a truck mounted mobile unit would most likely use hydraulic motors. A trailer mounted unit, however, may use electric motors.)

In operation, the partially drained plastic oil containers are fed into the feed hopper 4. In the automatic operation mode, the unit starts in a priority sequence with the centrifugal separator 2 first, followed by the chipper 10 (including the crammer 8). With these items running, the chipper conveyor 6 starts which will commence loading the chipper 10 and ultimately, the centrifugal separator 2. At a predetermined container count obtained in the scanning station 7 (which is determined by the optimum load for the centrifugal separator 2), the chipper conveyor 6 and the chipper 10 shut down. After a predetermined cycle time, the centrifugal separator 2 slows to its discharge speed (in the case of the U.S. patent application entitled RING CENTRIFUGE APPARATUS FOR RESIDUAL LIQUID WASTE REMOVAL FROM RECYCLABLE CONTAINER MATERIAL filed on Jun. 6, 1992) or stops and opens its discharge doors (in the case of the U.S. patent application Ser. No. 07/677,307, entitled CENTRIFUGE APPARATUS FOR RESIDUAL LIQUID WASTE REMOVAL FROM RECYCLABLE CONTAINER MATERIAL) now U.S. Pat. No. 5,149,424. Simultaneously, the process conveyor 28 starts for a predetermined time interval.

If containers remain in the scanning station 7 sensing area, the process will restart by bringing the centrifugal separator 2 and the chipper 10 to operating speed and subsequently starting the chipper conveyor 6. This batch cycling process will continue as long as the feed hopper 4 remains full an all other controls, safety interlocks and level sensors remain in a "run" condition. (On the other hand, the controls will commence a shut down sequence when the scanning station 7 senses no passing containers for a predetermined interval of time.)

The oil pump and filtration 24 unit is usually controlled by a liquid level sensor in the centrifuge containment housing 20. Other automatic controls are used where necessary. Generally, the oil scavenger pump 58, any oil holding tank 62 valves, and the bin unloading conveyor 66 functions are manually controlled. Various high level and safety controls and indicators are used to stop or modify the process as necessary for safe and economical operation.

In the case of a unit mounted on a larger truck frame, the available power would come from the truck engine. This would include hydraulic power for most motor driven equipment and an electrical supply of 24 volts direct current for the controls and selected smaller motors. An alternate embodiment for the process may be a trailer unit such as a fifth wheel trailer towed by a pick-up. In this latter case, the entire process may be driven by electric motors powered from an external electrical receptacle. This might be the case when a oil container recycling service was provided to service stations and automotive repair facilities.

Centrifugal testing has been conducted to determine the ideal angular velocity for the centrifugal separator 2. The tests were done with high density polyethylene (HDPE) oil container material contaminated with 30-weight viscosity motor oil it was determined that acceptable stripping of the oil from the plastic commences at a centrifugal force proportional to an acceleration of 330 g. it was also determined that performance of the centrifuge is improved as the angular velocity is increased. A range of tests were conducted to a centrifugal force upper limit proportional to an acceleration of 1,225 g. (Speed tests higher than this were deemed unadvisable for safety and mechanical considerations.) Required process dwell time is reduced proportionately as the higher radial forces are applied.

While the present process has been described in limited applications, it is to be understood that various modifications and other embodiments of the present process may be made without departing from the scope of the invention as described herein and as claimed in the appended claims.

The process in which an exclusive property or privilege is claimed are defined below.

What I claim is:

1. A compactly contained method of centrifugal removal of residual liquid motor oil waste from recyclable plastic containers wherein a centrifugal apparatus separates the co-mingled recyclable granulated plastic container material from said residual liquid motor oil waste, and wherein said method comprises substantially the entire plastic granulation and motor oil separation methods necessary to recover said recyclable granulated plastic container material in a form suitable for plastic reprocessing, and further, wherein said method removes said residual liquid motor oil waste in substantially an unaltered form, said method comprising:
   a first step wherein substantially whole recyclable plastic containers containing residual liquid motor oil waste are placed in a feed hopper,
   a second step wherein said substantially whole recyclable plastic containers containing residual liquid motor oil waste are transported with a conveying means from said feed hopper into a chipper or size reduction device,
   a third step wherein said substantially whole recyclable plastic containers containing residual liquid motor oil waste are reduced to substantially a chip or granulate of a pre-determined size within said chipper or size reduction device,
   a fourth step wherein said recyclable granulated container material while co-mingled with said residual liquid waste is discharged from said chipper or size reduction device into said centrifugal separation apparatus;
   a fifth step wherein said centrifugal separation apparatus is rotated at sufficient angular velocity to strip said residual liquid motor oil waste from said recyclable granulated plastic container material;
   a sixth step wherein said residual liquid motor oil waste is directed into an oil holding tank for subsequent recovery; and,
   a seventh step wherein said recyclable granulated plastic container material is directed into a plastic holding bin wherein the centrifugally processed recyclable granulated plastic container material is contained upon completion of said centrifugal process.

2. A method of centrifugal removal of residual liquid motor oil waste from recyclable plastic containers as defined in claim 1 wherein a scanning station is utilized for the purpose of counting said passing recyclable granulated plastic containers passing through the process.

3. A method of centrifugal removal of residual liquid motor oil waste from recyclable plastic containers as defined in claim 1 wherein an oil pump and filtration unit is utilized to transport and filter said residual liquid motor oil waste prior to discharge into an oil holding tank.

4. A method of centrifugal removal of residual liquid motor oil waste from recyclable plastic containers as defined in claim 1 wherein an oil containment pan located under the apparatus of said process is utilized for the purpose of collecting spilled residual liquid motor oil.

5. A method of centrifugal removal of residual liquid motor oil waste from recyclable plastic containers as defined in claim 1 wherein an oil scavenger pump operating in cooperating with a sump in said oil contaminated pan is utilized for the purpose of collecting said spilled residual liquid motor oil.

6. A method of centrifugal removal of residual liquid motor oil waste from recyclable plastic containers as defined in claim 1 wherein said compactly contained process is mounted on a truck body.

7. A method of centrifugal removal of residual liquid motor oil waste from recyclable plastic containers as defined in claim 1 wherein said compactly contained process is mounted on a trailer body.

8. A method of centrifugal removal of residual liquid motor oil waste from recyclable plastic containers as defined in claim 1 wherein said compactly contained process is utilized as a land-based processing plant.

* * * * *